Dec. 15, 1964     K. H. BUTLER ETAL     3,161,797
ELECTROLUMINESCENT DEVICE
Filed Feb. 28, 1962
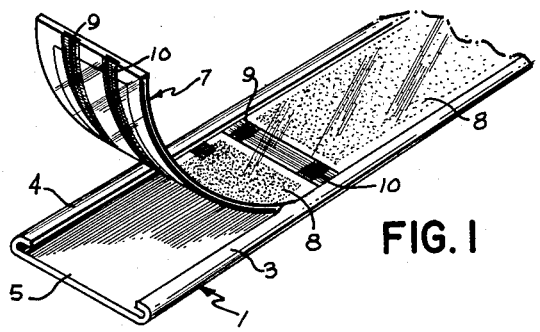
FIG. 1
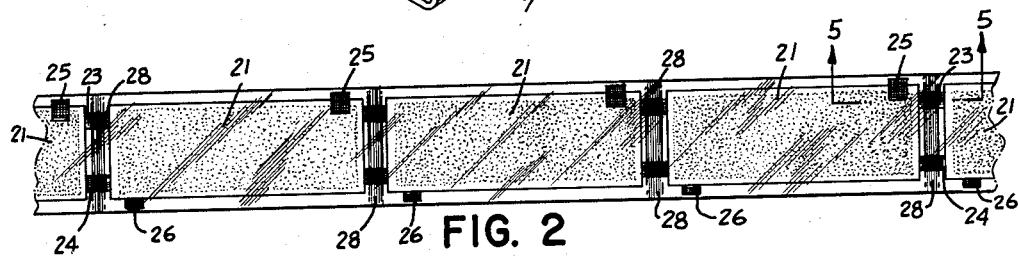
FIG. 2
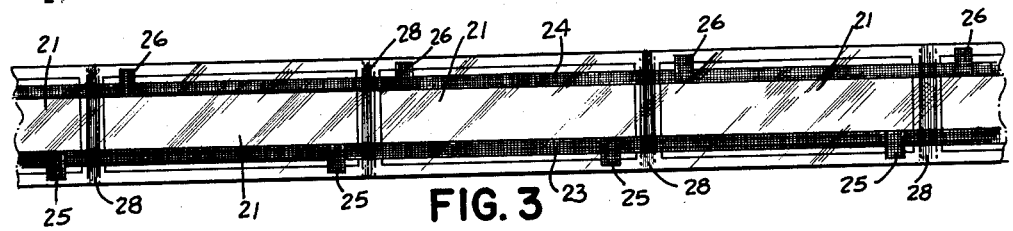
FIG. 3
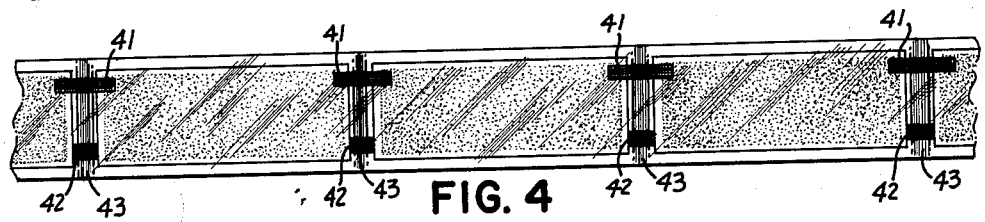
FIG. 4
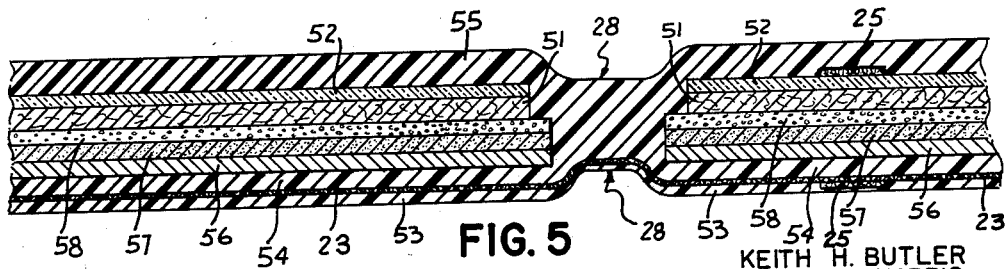
FIG. 5
KEITH H. BUTLER
JOSEPH M. HARRIS
HORACE H. HOMER
INVENTORS
BY 
ATTORNEY

United States Patent Office 3,161,797
Patented Dec. 15, 1964

3,161,797
ELECTROLUMINESCENT DEVICE
Keith H. Butler, Marblehead, Joseph M. Harris, Topsfield, and Horace H. Homer, Arlington, Mass., assignors to Sylvania Electric Products Inc., Salem, Mass., a corporation of Delaware
Filed Feb. 28, 1962, Ser. No. 176,373
5 Claims. (Cl. 313—108)

This invention relates to electroluminescent devices and more particularly to flexible electroluminescent devices which are arranged as a series of separate, distinct and severable electroluminescent cells.

Electroluminescent devices are well known to the art and methods have previously been devised for their fabrication. Flexible electroluminescent devices are also known to the art, but their commercial acceptance has not been as great as the inflexible type. However the flexible electroluminescent devices offer many advantages not afforded by the inflexible types; they may easily be formed into complex shapes or even bent around corners. Because many of the inflexible devices are based upon the use of glass dielectrics, they suffer from all of the drawbacks commonly associated with thin layers of glass. Notable among these are excess weight and fragility. The inflexible devices may also utilize conducting glass which forms a light-transmitting electrode and is made of glass having on one side thereof an electrically conducting iridized metal oxide film integrally united with the surface. Suitable metals for this film may be tin, indium or vanadium, either alone or taken in combination.

So to remedy the problems of thin glass layer construction, the art has turned to lamps utilizing flexible components. The light transmitting electrode in these flexible devices is often a flexible sheet of compacted glass fibers in the form of a conducting glass paper or cloth. The glass paper or cloth is made electrically conductive by subjecting it at a high temperature to the action of chemicals, including a salt of one of the metals mentioned previously, which decompose to form a conductive oxide integrally united with the surface of the glass fibers. The phosphor is no longer embedded in a glass dielectric, but rather certain high dielectric constant plastics are used. The base for the device generally serves as an electrode and is commonly prepared of aluminum foil or other suitable flexible conductive materials.

It will become apparent that it is possible to prepare an electroluminescent device in the shape of long flexible strips. And it is quite possible for these long strips to be wrapped around a spool for sale by retailers in the same manner as electrical rope. That is, the customer would merely ask for a certain number of feet of electroluminescent device and the retailer would then cut off this amount from the spool. But because of the construction of previous flexible electroluminescent devices, such advantages were impossible to realize. Cutting through the device would cause contact of the electrodes, thus producing a short circuit. Also bare edges of the electroluminescent phosphor layer would be exposed, thus allowing humidity penetration and causing reduction of the light output.

Now acocrding to our invention we have discovered that a laminated electroluminescent device in shape of a tape can be made of a plurality of separate and distinct electroluminescent cells each individually hermetically sealed and electrically insulated from each other within a flexible light-transmitting plastic. The individual cells are illuminated through current conveyors which are disposed along the length of the device and across each of the hermetic seals between adjacent cells. To sever predetermined lengths of electroluminescent devices one merely cuts the device at any hermetic seal between adjacent lamps.

Accordingly, the primary object of our invention is the provision of an electroluminescent device wihch may be readily cut into any length.

And another object of our invention is the provision of a flexible electroluminescent device which may be cut into smaller units without damaging the device or producing short circuits.

A feature of our invention is that the electroluminescent device is formed of a plurality of flexible electroluminescent cells, separate and distinct from each other, but joined together by the plastic which seals the individual cells from the atmosphere.

Another feature of our invention is use of a pair of current conveyors which extend along the length of the electroluminescent device and across the hermetic seal which separates adjacent cells from each other.

An advantage of our invention is that the electroluminescent device may be cut into lengths which are multiples of the length of the individual units without affecting adversely the light emission of the electroluminescent cells and without allowing humidity penetration or short circuiting.

The many other objects, features, and advantages of our invention will become manifest to those versed in the art upon reading the following specification when taken in conjunction with the accompanying drawings wherein specific embodiments of our invention are shown and described by way of illustrative examples. Of these figures:

FIGURE 1 is a perspective view of the flexible electroluminescent tape according to our invention. The electroluminescent device is partially separated from a backing sleeve to illustrate the construction.

FIGURE 2 is a frontal view of the electroluminescent device showing the various electroluminescent cells and the interconnecting current conveyors.

FIGURE 3 is a rear view of the electroluminescent device shown in FIGURE 2.

FIGURE 4 is a frontal view of another embodiment of our electroluminescent device wherein the current conveyors are arranged differently then that shown in FIGURE 2.

FIGURE 5 is a cross-sectional view taken along the lines 5—5 of a portion of the electroluminescent device shown in FIGURE 2. Each of the various layers of one embodiment of the laminated structure are shown in this figure.

Turning now to FIGURE 1, a flexible electroluminescent device is shown positioned within a C-shaped flexible plastic sleeve 1 which protects the rear of the device and allows the unit to be tacked or nailed when desired. As an integral part of the sleeve and overlapping each side of the face of the device are flexible retainers 3 and 4. Because these retainers 3 and 4 are spaced from the base 5 of the sleeve 1 by no more than the thickness of the electroluminescent device 7, the latter is firmly held therein. Since the retainers 3 and 4 are flexible, easy stripping is afforded when it is desired to remove the device 7 from the sleeve 1.

Although the sleeve 1 is preferably prepared of flexible material such as a vinyl polymer or an epoxy, other materials may also be used. And when desired an inflexible material may also be used such as thin aluminum or other metals, but in these cases of course, much of the advantages ensuing from the use of flexible cells will be lost. Yet when permanence is a desirable attribute, the use of metal may be advantageous. To produce a product having enhanced aesthetic value the sleeve 1 may be colored appropriately to blend in with the cell emission color. But if a cell is to be constructed which emits light from both sides, thus substituting another light-transmitting electrode for the conventional aluminum electrode, the sleeve 1 may be transparent.

Our electroluminescent device comprises at least two separate and distinct electroluminescent cells 8. Each of the cells 8 are electrically connected to each other and in turn connected to a power source by a pair of current conveyors 9 and 10. The current conveyors 9 and 10 are longitudinally disposed along the length of the electroluminescent device. Preferably they are positioned beneath the base electrode in the device so as to hide them, however on some occasions disposition on the light-transmitting face may be desirable. In all cases however, the current conveyors should extend across the hermetic seal between adjacent cells 8 so that the device may be easily severed when desired.

Thus when it is desired to connect the electroluminescent device to a power source, lead-in probes (not shown) can be forced through one end of the plastic laminations and the sleeve 1 into direct contact with the current conveyors 9 and 10. The other end of the electroluminescent device is capped off by a suitable insulator (not shown) so that the free ends of the current conveyors 9 and 10 are not bare.

Referring now to FIGURE 5, a cross section of our electroluminescent device is illustrated. The sleeve shown in FIGURE 1 has been stripped away and not shown so as to make the view more readily comprehensible. Each cell is composed of flexible components, generally, but not necessarily, rectangular in shape, laminated together and hermetically sealed within strips of plastic material. The cell may be energized by applying an alternating voltage, for instance 118 volts, 60 cycles A.C. to current conveyors which are disposed along the length of the device and across the hermetic seals between adjacent cells. The lower insulating film or sheet 54 and the upper insulating sheet 55, which form respectively, the underside and the top side of the envelope in the finished device, comprise sheets of thermoplastic material which flow under heat and pressure and weld together along the margins. The material selected must be reasonably tough and stable, in addition to being light transmitting and fairly flexible. Examples of such materials are polyethylene, polytetrafluoroethylene, chlorotrifluoroethylene, polystyrene, methylmethacrylate, vinylidene and vinyl chloride and fluoride polymers. A preferred material is Kel–F film about 0.005 inch thick.

For the cell itself, a rectangular sheet of thin metal foil can serve as the base electrode and can be coated with an insulating layer 57 of high dielectric constant materials. A light-emitting layer 58 including an electroluminescent phosphor is coated upon the base electrode in sufficient thicknesses to effect electroluminescence upon the application of the varying or alternating current.

For a light-transmitting electrode 51 in the device, we have found that a sheet of electrically conducting glass paper or fiber may be disposed upon the phosphor layer, although almost any compatible and flexible, electrically-conductive light-transmitting material may be used. To prevent short circuiting, a small recess or margin must be left around the periphery of the layer light emitting material 58, so that the electrode 51 may not touch the base electrode.

When using a flexible glass fiber as the light-transmitting electrode, it may be secured to the phosphor layer 58 by placing a thin sheet 52 of plastic such as, low density polyethylene or preferably nylon over the fiber and then raising the temperature of the cell. The nylon will flow down into the matrix of the fiber and secure itself to the phosphor layer 58 thus causing adhesion. The glass paper sheet is then bound in place being at least partially embedded in nylon and also cemented to the phosphor layer 58 on the metal foil.

The metal foil 56 may be a dead soft annealed aluminum sheet of 0.008 inch thickness, coated with a thin insulating layer of barium titanate dispersed in an organic polymeric matrix and overcoated with electroluminescent layer of phosphor such as copper activated zinc sulfide.

Many polymeric matrixes, such as cellulose nitrate, polyacrylates, methacrylates, polyvinyl chloride, cellulose acetate, alkyd resins, epoxy cements, and polymeric triallyl-cyanurate, to which may be added modifying substances or plasticizers such as camphor, dioctylphthalate, tricresylphosphate and similar materials may be used to disperse the phosphor and the dielectrics. For a preferred organic matrix forming a dense tough film of high dielectric constant and great mechanical and thermal stability, we may use cyanoethylcellulose such as described and claimed in the copending application of Thomas Sentementes et al. S.N. 94,536, filed March 9, 1961 and entitled "Electroluminescent Devices And An Improved Dielectric Media For Such Electroluminescent Devices," and assigned to the assignee as the present invention. The barium titanate layer dispersed in a cyanoethylcellulose solution may be applied to the aluminum foil by spraying or preferably through the use of a doctor blade and then drying. The phosphor layer, similarly dispersed in a cyanoethylcellulose solution may be applied over the barium titanate layer in the same manner.

The conducting glass paper 51 comprises a commercially available micro-fiber glass paper 0.001 inch thick which is made conductive by dipping in a solution of a metal salt which, upon drying and baking at an elevated temperature, forms an electrically conductive coating. A suitable solution for producing such electrical conductivity may consist of indium basic trifluoroacetate with stannic chloride dissolved in an organic solvent such as ethylene propyl monoethyl ether acetate.

In order to energize the electroluminescent cell, it is necessary to apply an alternating potential between the conductive layers, that is the aluminum foil layer 56 and the conductive glass paper 51. This may be conveniently effected by means of spaced apart, flexible braids or ribbons, each of which is individually connected to one of the electrodes. Although only one of these copper bands is shown in the instant figure, both may be of substantially identical construction. Connector 26 extends from one of the current conveyors (not shown) and is in electrical conducting relation with the glass fiber layer 51, but insulated from the base electrode 56 of aluminum foil. Because the current conveyor 24 extends along the entire length of electroluminescent device they extend across each hermetic seal between adjacent electroluminescent cells and when puncturing-type, lead-in probes are placed in contact with the current conveyors, they may be conveniently energized. Of course, in addition to copper screens or braids, many other suitable current conveyors may also be used, for example, a printed circuit may be readily integrated into the electroluminescent device, thus minimizing construction costs. There is no criticality concerning the manner in which the current conveyors are secured to the electroluminescent cells. During high sealing, the copper screens may be embedded in lower thermoplastic sheet 53 which is disposed beneath, thus making an entire and complete unit. But another method which is equally successful is securing the current conveyors to the back of the lower thermoplastic sheet 54 with Mylar or vinyls coated with an adhesive on one side. The end of the current conveyors need not extend beyond the ends of the electroluminescent device since our device is particularly adapted to allow for puncturing of an electrical lead-in probe, although of course, such extensions might be desirable in some cases.

The method of laminating the cell is well known and according to conventional procedures, a vacuum operation is used to purge the laidup components of the cell of gases and at the same time to hold the cell in perfect registery until placed in the laminating press wherein a pneumatic or hydrostatic laminating procedure is used. It is essential however to remove all traces of residual gases and moisture in the cells because they would be detrimental to the efficiency of the device. Where nylon is used, the pressure applied to the lay-up may be approximately 500 lbs. per square inch, and the temperature in the range of 110° C. to 200° C. depending upon the grade of plastic. For instance, a temperature of 150° C. applied for a period of ten minutes is usually sufficient to fuse the plastic. After cooling, the pneumatic pressure and the vacuum are both released and the press is opened. The finished laminated electroluminescent device is easily removed.

The front and rear respectively of our electroluminescent device is shown in greater detail in FIGURES 2 and 3. Each of the cells 21 are disposed within a jacket of flexible light-transmitting plastic. The current conveyors 23 and 24 extend along the length of the electroluminescent device and preferably are disposed on the bottom thereof so as not to obstruct the light-emitting face. Through the seal between each of the adjacent cells, the current conveyors will be visible through the plastic. Current connectors 25 and 26 generally prepared of the same material as the current conveyors 23 and 24, that is copper screens or braids, are used to transmit current to the electrodes in the electroluminescent device. One end of current connector 25 is attached to current conveyors 23 by welding, soldering or even wrapping. The other end may be attached to the light-transmitting electrode of a cell with an epoxy glue or similar attachment. In a similar manner, current connector 26 is attached at one end to current conveyor 24 and at the other end is in electrical conducting relation with the opaque base electrode of the cell. Of course, if desired, the current connector to the base electrode may be eliminated by disposing the current conveyor 23 directly upon the base electrode of the cell 21. And so too with the current conveyor 23 which conducts current to the light-transmitting electrode of the cell. While the result may not be aesthetically pleasing, the current conveyor 23 may be disposed directly upon the light-transmitting electrode of the cell.

When the electroluminescent device is to be cut, a conventional scissors may be used to cut through the plastic hermetic seal 28 between adjacent cells 21. Of course cutting may not be performed while the current conveyors 23 and 24 are connected to a power source.

In the completed device the current conveyors 23 and 24 are insulated from each other and also insulated from accidental manual contact. The latter insulation is afforded either by the Mylar coated with adhesive material and affixed to the rear of the hermetic sealing plastic or by the hermetically sealing plastic layer itself as discussed previously.

The device shown in FIGURE 4 is similar to that in FIGURES 2 and 3 however in this figure, the current conveyors 41 and 42 are not continuously disposed along the length of the electroluminescent device, but rather are serially positioned so as to connect adjacent electrodes together. Separate and distinct current conveyors are connected to each electrode. Current conveyor 41 is cemented to the light-transmitting electrode and current conveyor 42 is attached to the base electrode. But in each case these current conveyors are disposed across the hermetic seals 43 between adjacent cells to allow for easy severance of the device.

While certain specific embodiments of the invention have been described in detail, the same are given as illustrative and not in order to limit the invention thereto. The scope of the invention is to be determined by the appended claims.

As our invention we claim:

1. A laminated electroluminescent device comprising: an envelope of thermoplastic material, at least a portion of which is light transmitting; at least two electroluminescent cells, hermetically sealed within said envelope and insulated from each other by the hermetic seal of said envelope, said cells comprising, at least two superposed electrodes, at least one of which is light transmitting, and a layer of light-emitting material including an electroluminescent phosphor disposed between said electrodes; means to conduct current to each of said electrodes in each of said electroluminescent cells, said means comprising, at least two longitudinal disposed current conveying means, insulated from each other and each insulated from one of the electrodes in said cells, said current conveying means extending along the length of said electroluminescent device and passing across the seal between each of said electroluminescent cells.

2. The electroluminescent device according to claim 1 wherein the current conveying means is disposed within the hermetically sealed envelope.

3. The electroluminescent device according to claim 1 wherein the current conveying means is affixed to the rear of the hermetically sealed envelope by a layer of insulating tape coated with an adhesive.

4. The electroluminescent device according to claim 1 wherein current connectors are provided for each cell and are attached to the current conveyors and to the electrodes.

5. A laminated electroluminescent device comprising: an envelope of thermoplastic material, at least a portion of which is light transmitting, at least two electroluminescent cells, hermetically sealed within said envelope and insulated from each other by the hermetic seal of said envelope, said cells comprising, at least two superposed electrodes, at least one of which is light transmitting, and a layer of light-emitting material including an electroluminescent phosphor disposed between said electrodes; means to conduct current to each of said electrodes in each of said electroluminescent cells, said means comprising, at least two longitudinally disposed current conveying means, insulated from each other and each insulated from one of the electrodes in said cells, said current conveying means extending along the length of said electroluminescent device and passing across the seal between each of said electroluminescent cells; a C-shaped sleeve disposed beneath said electroluminescent device and passing around the frontal edges of said electroluminescent cells.

References Cited by the Examiner

UNITED STATES PATENTS

| | | | |
|---|---|---|---|
| 2,881,344 | 4/59 | Michlin | 313—108 |
| 2,945,976 | 7/60 | Fridrich | 313—108 |
| 3,008,065 | 11/61 | Chamberlin | 313—108 |

GEORGE N. WESTBY, *Primary Examiner.*

ARTHUR GAUSS, *Examiner.*